Dec. 3, 1963    R. K. NOLEN ETAL    3,113,202
RESISTANCE WELDING METHOD
Filed Aug. 30, 1961
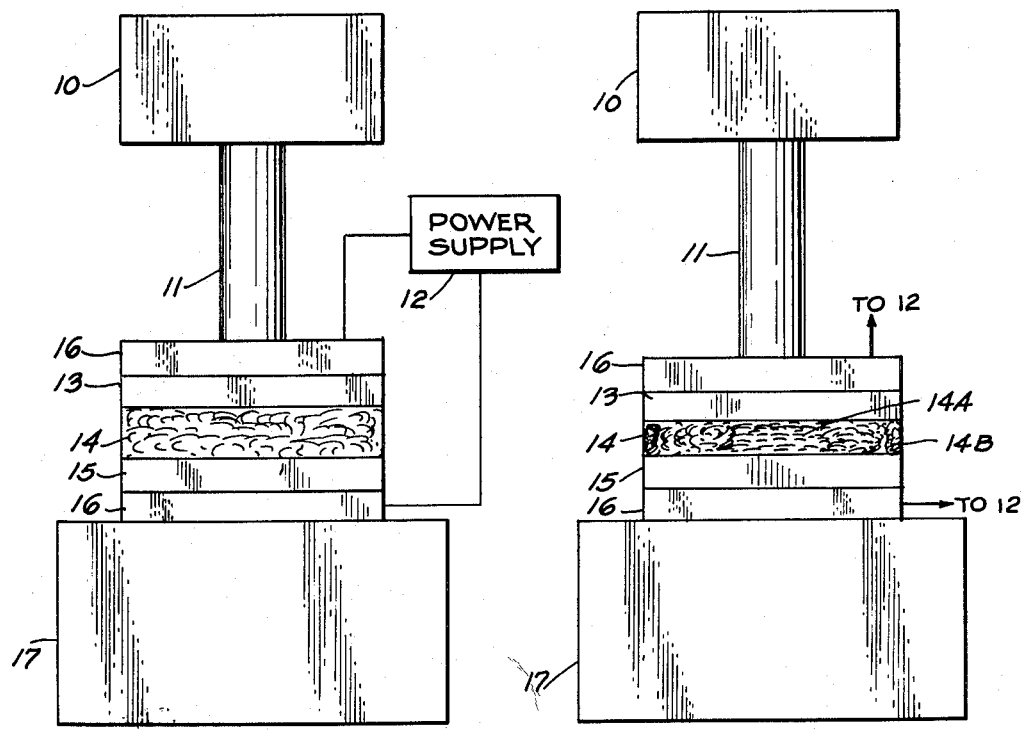
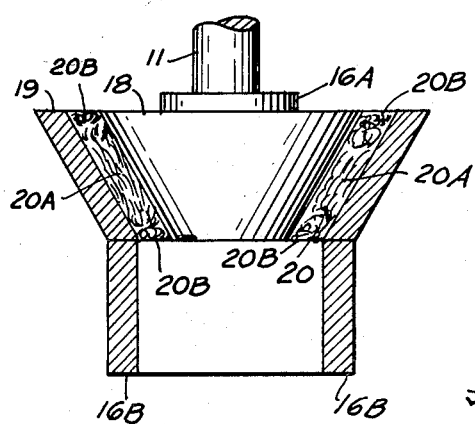
INVENTORS.
ROBERT K. NOLEN
HARRY SCHWARTZBART
JOHN F. RUDY

United States Patent Office 3,113,202
Patented Dec. 3, 1963

3,113,202
RESISTANCE WELDING METHOD
Robert K. Nolen, Chicago, and Harry Schwartzbart, Evergreen Park, Ill., and John F. Rudy, Chesterton, Ind., assignors to Armour Research Foundation of Illinois Institute of Technology, Chicago, Ill., a not-for-profit corporation of Illinois
Filed Aug. 30, 1961, Ser. No. 134,976
12 Claims. (Cl. 219—117)

This invention relates to welding and more particularly, to a novel method whereby a fiber metal insert is used in resistance welding to increase the interface resistance at the faying surfaces of the members to be joined.

Before proceeding further it is thought that the term "metal fibers" as employed in this specification should be briefly discussed. This term is intended to denote an elongated metallic filament having a long dimension substantially greater than its mean dimension is cross section. As a general rule, a fiber should have a length at least 10 times its mean dimension in cross section. The term "mean dimension in cross section" is related to the shape of the fiber and refers to the diameter thereof in the case of circular filaments, or in the case of rectangular ribbons, denotes one-half the sum of the short side and the long side of the rectangle. The fiber metal shims are produced from a starting material consisting of these fibers.

While the dimensions of the individual fibers may vary considerably, depending upon the size and contours of the surfaces to be joined, for most applications the fiber lengths may vary from about 0.05 to 2 inches although preferably the length will be on the order of one-eighth to one-half inch. For most purposes, the fiber should have a mean dimension in cross section in the range of about 0.0001 to about 0.05 inch.

The distinct advantages of this method are best illustrated by reviewing, briefly, standard resistance welding techniques to which it may be applied.

*Spot welding.*—In practice, for example, two sheets to be spot welded are placed between cylindrical electrodes, and the current is passed through the sheets. Because of the contact resistance at the interface between the sheets a thermal gradient exists through the thickness of the sheets and the material at the interface first reaches the melting temperature. At an appropriate time, current flow is terminated, and the molten material solidifies into a nugget.

The location and size of the nugget depends upon location and size of the electrodes and on the amperage and time it is applied.

The steepness of the thermal gradient through the thickness of the sheet is a function of, among other things, the contact resistance at the faying interface, resistance of the base metal, and the contact resistance at the electrode-base metal interface. The greater the faying interface resistance with respect to the other resistances in the current path, the steeper is the thermal gradient. The geometry of heat extraction, temperature and thermal conductivity of the electrodes are other factors controlling the slope of the thermal gradient.

Normally, there exists an appreciable heat affected zone around the case nugget, in which beneficial effects of cold work or heat treatment may be removed. Martensite may also be formed in the heat affected zones of spot welds in some steels because of the rapid cooling rate. The accumulation of liquid metal at the faying surface and in either direction from this surface into the sheets to be joined, plus the fact that this liquid is placed under pressure by the electrode force, can result in loss of liquid metal from the weld area. This loss allows appreciable electrode indentation into the two sheets. Such indentation is undesirable and should be avoided. Because of these and other considerations, it is sometimes definitely advantageous to increase the ratio of contact resistance to bulk resistance, thereby creating a steeper thermal gradient through the sheet thickness.

*Seam welding.*—Seam welding is identical to spotwelding, except that the electrodes are in the form of wheels, and the spot welds are overlapped to provide a continuous weld.

*Projection welding.*—Projection welding differs from spot welding in regard to the means of locating the welds. Recall in spot welding that the size, shape, and location of the weld depends upon the size, shape, and location of the electrodes. In projection welding, however, the size, shape and location of the weld depends upon the size, shape, and location of projections on the work to be welded. For example, if it is desired to weld a cylinder to a plate, one may provide a ring projection on the cylinder (or on the plate), place the assembly between flat electrodes, and pass a current which will flow through the projection, heating the pieces in the region of the projection. Projection welding gets more critical as the size of the pieces to be welded increases, and is less likely to yield reproducible results the more relaxed are the dimensional tolerances of the individual piece parts. This follows logically from the strong effects of pressure on contact resistance, and of mismatch, cocking, and misalignment on projection contact and current distribution.

It is basic to sound projection welding design that the surfaces to be welded be perpendicular to the electrode force axes. A force component which would apply shear to the surfaces to be welded may cause relative sliding or displacement, decreasing the chances of making a sound weld.

*Resistance butt welding.*—Resistance butt welding is most generally used to join bars, tubes or pipes. Clamps are placed upon each bar such that end faces to be joined butt each other under pressure through the clamping network. Current, which is introduced through the clamps, is passed through the bars, and the butt interface to be joined. Generally, upsetting pressure is applied so that some barrelling of the bars is produced. Under these circumstances, the ratio of contact resistance to bulk resistance is not high, and the electrodes, or clamps, which act as heat sinks, are some distance away. Because of the spacing of the electrodes they are less effective as extractors of heat than are the electrodes in the resistance welding processes previously described. Consequently, the thermal gradient along the length of the bars away from the interface is not steep, and the base metal is heated considerably, destroying the beneficial effects of cold working or heat treatment which one may wish to retain. In this case, as in those heretofore discussed, an even more definite advantage may accrue from increasing the ratio of contact resistance to bulk resistance, and thus increasing the steepness of the thermal gradient away from the joint interface.

Also, it is to be noted, that in those instances where the thermal gradient is not steep away from the interface of the joint greater amounts of power are required because of the energy expended in heating metal away from the interface. Furthermore, there is less barrelling when the gradient is steep due to the reduced plastic zone.

Accordingly, one object of this invention is to provide a resistance welding method wherein the power required to make the weld is lower than the conventional resistance welding.

Another object of this invention is to provide a resistance welding method which enables the welding of cold worked or heat treated metals, without as great a deleterious effect on joint strength.

A further object of the instant invention is to provide a resistance welding method enabling the joining of dissimilar metals with little difficulty.

Still another more specific object of this invention is to provide a better resistance welding method by increasing the ratio of contact resistance to bulk resistance by the use of a fiber metal insert at the joint interfaces.

A further object of this invention is to provide a resistance welding method which minimizes electrode indentation.

Still another object of this invention is to provide a resistance welding method which eliminates the requirement that surfaces to be projection welded be perpendicular to the electrode force axes.

The foregoing and other objects of this invention will become more apparent to the reader from the detailed description taken in connection with the accompanying drawing to follow, in which:

FIGURE 1 illustrates, diagrammatically, apparatus capable of performing the method.

FIGURE 2 is a fragmentary view of the apparatus of FIGURE 1, illustrating the inherent sealing features of the method which takes place after the application of current but prior to the accomplishment of the weld.

FIGURE 3 is a view, partly in section, illustrating a different application of the method in an idealized situation pointing out the versatility of the method.

In FIG. 1 a resistance welder consisting of press 10, ram 11, electrodes 16, table 17 and power supply 12 is shown. Members 13 and 15 are to be welded together. A fiber metal insert 14 is placed between members 13 and 15 such that it is interposed between the surfaces to be joined.

Now when current is passed through this arrangement, simultaneously with the application of pressure, the relatively higher resistance of insert 14 causes a large proportion of the power dissipated to be used up in heating the metal fibers. This resistance is due to the cross section of the fibers and the great number of contact resistances provided by the fibrous network in the current path. It is noted that just prior to accomplishment of the weld insert 14 is compacted to substantially 100% density by the applied pressure. In this way porosity in the weld is substantially eliminated. Furthermore, photomicrographs (150X) clearly show that insert 14 in its compacted state provides a great number of contact resistances (fiber-fiber) in the current path.

The electrical analog of the arrangement shown in FIG. 1 is a series circuit. However, the heat generated in each will not be the same because of the different resistances of members 13, 14, 15 and 16. In this respect, of course, that element having the highest resistance will generate the most power (heat). As is well known, the heat should be concentrated at the faying surfaces in order to accomplish the best weld. In other words, the weld temperature should be maximum at the faying surfaces. To this end, we have disclosed that a fiber metal network such as insert 14, consisting of short lengths of thin metallic fibers provides this result with high uniformity in addition to other benefits following from the use thereof.

Because insert 14 presents a multiplicity of contact resistances in the current path, the metal therein reaches its melting point while the base metal, or members 13 and 15, remain relatively cold. In effect, the fibers comprising insert 14 cause the ratio of contact resistance to bulk resistance (a cumulative or series resistance of member 13 to insert 14 and insert 14 to member 15) to be increased enormously. In other words, the slope of the thermal gradient in members 13 and 15 is increased because of insert 14.

One unique advantage of this method is illustrated in FIG. 2 wherein the to be welded members illustrated in FIG. 1 are shown after the application of current, but prior to completion of the weld. As shown, the central portion 14A of insert 14 is molten whereas, the outermost portion of 14B thereof is beginning to melt. As the melting progresses, insert 14 compacts to one hundred percent density. A seal is formed by the unmelted but densified fibers 14B on the outer periphery of insert 14. That is to say, there is a band 14B of compacted, sintered fibers surrounding the molten fibers upon completement of the weld. These fibers around rim are though to confine the liquid steel by quenching this liquid metal as it begins to flow radially. This is believed due to the fact that the outer periphery of the fibers (14B) is not in the zone of maximum current density and, therefore, does not melt. Furthermore, 14B is cooler than 14A because of radiation loss.

In FIG. 3 another advantage to the fiber metal resistance welding method is illustrated. As discussed above, a weld is difficult to uniformly reproduce where electrode pressure is not perpendicular to the surfaces to be welded, or where shear movement occurs during welding. The reproducibility of this type of weld because of shear motion is poor. On the other hand, if a fibrous metal sheet 20 is placed between the surfaces of members 18 and 19 to be joined, its high contact resistance causes it to melt easily during passage of current. This melting provides a liquid metal reservoir which assists in bonding to the cold surfaces which are introduced to the weld zone by this shear motion. Also, rim fibers 20B assist in containment of the melted fibers 20A during shear movement. Electrodes 16A and 16B pass the current and pressure to the members. After current flow is terminated, the molten metal solidifies with cooling, and bonds the two surfaces.

This invention may best be fully envisioned by reference to the following examples:

EXAMPLE I

A mild steel to mild steel bond with a mild steel fiber insert was accomplished successfully by spot welding. The insert was 11 percent dense and 0.030 inch thick. The mild steel sheet material was of the same thickness. With a 60 cycle power supply, a weld time of 15 cycles (0.25 second) at 6000 amps. was applied; the electrode force was 500 pounds. Nuggets approximately ⅜ inch in diameter were produced with little or no apparent electrode indentation. Furthermore, less current was required to obtain their nugget sizes than is required to obtain comparable nuggets by conventional methods.

EXAMPLE II

A mild steel fiber insert, 16 percent dense and 0.030 inch thick was successfully used to clad two 2 inch by 3 inch by ¼ inch thick mild steel plates. A clad metal is defined as a composite of two or more metals joined at the large-area-surface in an essentially continuous manner by a metallurgical bond. At a current magnitude of approximately 100,000 amps., 3 current pulses at 50 cycles each with 10 cycles of cool time between pulses were applied with an electrode force of approximately 3,000 pounds. The total time involved (weld plus cool time) was 2.83 seconds. In this particular case, pulses were necessary to distribute the current and allow the resulting heat to obtain uniform melting of the fiber insert.

There are at least two possible forms the electrodes can have to make clad plate by our fiber metal resistance welding method, namely, platen (flat plates), and cylindrical rollers. In the former, the materials to be clad may be sufficiently small in surface area that the whole surface area bond may be achieved by contacting the platen electrodes to the work only once. On the other hand, for larger surface areas it may be necessary to index the work between electrodes until the entire surface is bonded. However, the cylindrical roller electrodes could be of sufficient length to progressively resistance weld the entire surface of the plates or sheets in a continuous (rolling) operation.

EXAMPLE III

Stellite rings were successfully joined to mild steel bodies with the introduction of a mild steel fiber metal insert between conical mating surfaces of the ring and body. With a current of approximately 132,000 amps. a 4 cycle weld time (0.067 second) at an electrode force of 6,300 pounds was used with good results. As has been before noted, the optimum situation for resistance welding is that the maximum heat generated should be at the faying surfaces. For dissimilar metals, this situation becomes more complex due to the difference of electrical resistance of the different metals. With conventional techniques, higher heat is generated in the stellite because of its higher resistivity. However, with a fiber insert, the highest heat was concentrated mainly at the insert. Better heat balance was obtained with the insert for the materials used in this example. Also, the fact that the surfaces were inclined to the electrode force axis did not preclude a good weld.

EXAMPLE IV

Molybdenum sheets 0.005 inch thick were successfully joined by interposing a fibrous insert consisting of 80 percent iron fibers and 20 percent molybdenum fibers which insert was 0.10 inch thick and 30 percent dense. This particular insert was prepared by standard fiber metallurgy techniques except that it was not sintered.

Welding parameters that produced the bond were, approximately 15,000 amps., 15 cycles (.25 second) weld time, and an electrode force of 1,500 pounds. The joints produced were ductile and showed good bonding between the insert and the sheet, with nuggets of approximately ¼ inch diameter. The network of fibers was filled by an iron-molybdenum liquid indicating that to some extent the iron in the insert acted as an impregnating filler material.

The problems in resistance spot welding of refractory metals are (1) the required temperature at the faying plane is so high (because of high melting points) that joining may occur at the base metal-electrode interface before it occurs at the faying surface; and (2) the refractory metals suffer rapid grain growth and embrittlement when heated above their recrystallization temperature. Both of these problems suggest the requirement for concentration of the heat at the faying plane, in preference to the interior of the sheet to be joined or to the electrode-work contact surfaces. The joints obtained in which the molybdenum sheets remained ductile is an indication that the maximum temperature reached was in the fiber insert and at the faying planes and not in the molybdenum sheet.

As was pointed out a significant feature of the method is the mechanical mixing of elemental fibers to form the shim insert. A composition can be selected such that its melting point may be sufficiently low so as to control the maximum temperature which the base metal reaches during the bonding cycle. This selection of fibers can also control to some extent the remelt temperature of the residual joint composition.

Since high service temperature requirements are the rule, it is usually desirous to obtain a joint with a remelt temperature which approaches the melting point of the base metal. The assumption is made that strength at high temperature will increase as the melting temperature increases. For example, if a sufficient amount of the iron in the iron and molybdenum fiber shim is lost from the joint by diffusion into the molybdenum fibers to cause the joint composition to become proportionately richer in molybdenum, the subsequent remelt temperature would be increased according to the iron-molybdenum phase diagram.

While molybdenum and iron fibers were used because of their favorable phase diagram, molybdenum and chromium and molybdenum and titanium are other combinations which could have been used for joining the molybdenum sheets.

EXAMPLE V

Two copper bars 1 inch in diameter and each 1¼ inch long were successfully joined by fiber metal resistance welding. An alloy of 88% copper and 12% tin in fiber form was interposed between the end surfaces of the bars. The insert material consisted of randomly orientated fibers which were not sintered nor compacted prior to welding. The pressure-current cycle compacted the fibers. The approximate insert thickness was 1/16 inch after compacting. Individual fibers, solid phase bonded to each other and to the bar surfaces, remained in the joint because sufficient current was not passed through the interfaces to cause any melting. Photomicrographs showed a joint of this type. Approximately 120,000 amps. flowing for 70 cycles (1.17 seconds) under an electrode force of 2,000 pounds was used to make the bond. The higher contact resistance in the fiber material was evidenced by the fact that there was no bonding between the copper bar-copper electrode interfaces.

EXAMPLE VI

Two aluminum rods ½ inch in diameter and ½ inch long were joined with a non-sintered and non-compacted aluminum fiber insert between the abutting surfaces. A current of approximately 70,000 amps. for 10 cycles (0.17 second) and an electrode force of 2,000 pounds was used to make the weld. The high contact resistance as provided by the fibers (in addition to the sufficient current) caused the fiber insert to melt and form a sound joint.

From the foregoing, it will be understood that this process is equally suitable for joining similar or dissimilar metals and that there exists a wide range of selection as to the composition of the insert. That is to say, the metals may be refractory or highly conductive. Of course, this selection depends on the particular application called for, but some general factors to be considered would be: (1) composition of the base metals to be joined; (2) the relative melting points and electrical resistivities of these base metals; (3) the phase diagrams of base metal-insert compositions and in the case of inserts of mixed elemental fibers, their particular phase diagrams would have to be considered; and (4) the necessity or desirability of sintering the fibrous network. As the point 4, sintered fiber inserts are easier to handle than unsintered inserts, but the contact resistance of an unsintered insert is higher than sintered inserts.

In connection with refractory metals, those metals and alloys with melting points in excess of approximately 2200° C. are considered as refractory. Likewise, those metals having resistivities less than about 3.4 micro-ohm centimeters, measured at 20° C. are considered high conductivity materials. For example, columbium, molybdenum, tantalum and tungsten are refractory metals and aluminum, copper, gold and silver are high conductivity metals.

From the foregoing, it will be appreciated that a novel resistance welding technique has been provided. However, it should be obvious that several modifications will be apparent to those skilled in this particular art without departing from the novel concepts of this invention. Accordingly, it is to be understood that within the scope of the appended claims the invention may be practiced otherwise than has been specifically set out in the detailed description of the invention.

We claim as our invention:

1. A method of bonding members comprising the steps of: placing a metal insert consisting of a sintered, porous mass of randomly oriented fibers between said members in abutting relation; passing electric current therethrough; and applying pressure to the members during the passage of said current.

2. A method of bonding metal members comprising the steps of: positioning a metal insert consisting of a porous mass of randomly oriented metal fibers between said members; passing electric current therethrough; and applying pressure across said members.

3. A resistance welding method of bonding members comprising the steps of: placing an insert consisting of a porous mass of randomly oriented metal fibers between said members in abutting relation to provide member-insert-member interfaces; contacting electrodes to said members in a manner to cause the insert to become part of a current carrying circuit, including said electrodes; and passing electric current through said circuit of magnitude and duration sufficient to liquify the fibers.

4. A resistance welding method of bonding members comprising the steps of: placing an insert consisting of a porous mass of randomly oriented metal fibers between said members in abutting relation to provide member-insert-member interfaces; contacting electrodes to said members in a manner to cause the insert to become part of a current carrying circuit, including said electrodes; passing electric current through said circuit of magnitude and duration sufficient to liquify the fibers; and applying pressure across the interfaces during the passage of said current to aid in the bonding of the members.

5. A resistance welding method of bonding members comprising the steps of: placing an insert consisting of a porous mass of randomly oriented, dissimilar metal fibers between said members in abutting relation to provide member-insert-member interfaces; contacting electrodes to said members in a manner to cause the insert to become part of a current carrying circuit, including said electrodes; passing electric current through said circuit of magnitude and duration sufficient to liquify the fibers; and applying pressure across the interfaces during the passage of said current to aid in the bonding of the members.

6. A resistance welding method of bonding dissimilar metal members comprising the steps of: placing an insert consisting of a porous mass of randomly oriented, dissimilar metal fibers between said dissimilar metal members in abutting relation to provide member-insert-member interfaces; contacting electrodes to said members in a manner to cause the insert to become part of a current carrying circuit, including said electrodes; passing electric current through said circuit of magnitude and duration sufficient to liquify the fibers; and applying pressure across the interfaces during the passage of said current to aid in the bonding of the members.

7. A resistance welding method of bonding metal sheets comprising the steps of: placing an insert consisting of a porous mass of randomly oriented metal fibers between the sheets to be bonded in abutting relation to provide sheet-insert-sheet interfaces; contacting electrodes to said sheets in a manner to cause the insert to become part of a current carrying circuit, including said electrodes; passing electric current through said circuit of magnitude and duration sufficient to liquify the fibers; and applying pressure across the sheet-insert-sheet interfaces during the passage of said current to aid in the bonding of said sheets.

8. A resistance welding method of bonding metal sheets comprising the steps of: placing an insert consisting of a porous mass of randomly oriented dissimilar metal fibers between the sheets to be bonded in abutting relation to provide sheet-insert-sheet interfaces; contacting electrodes to said sheets in a manner to cause the insert to become part of a current carrying circuit, including said electrodes; passing electric current through said electrodes of magnitude and duration sufficient to liquify the fibers; and applying pressure across the sheet-insert-sheet interfaces during the passage of said current to aid in the bonding of said sheets.

9. A resistance welding method of bonding dissimilar metal sheets comprising the steps of: placing an insert consisting of a porous mass of randomly oriented dissimilar metal fibers between the dissimilar metal sheets to be bonded in abutting relation to provide sheet-insert-sheet interfaces; contacting electrodes to said sheets in a manner to cause the insert to become part of a current carrying circuit, including said electrodes; passing electric current through said electrodes of magnitude and duration sufficient to liquify the fibers; and applying pressure across the sheet-insert-sheet interfaces during the passage of said current to aid in the bonding of said sheets.

10. A resistance welding method of bonding members comprising the steps of: placing an insert consisting of a porous mass of randomly oriented high conductivity metal fibers between said members in abutting relation to provide member-insert-member interfaces; contacting electrodes to said members in a manner to cause the insert to become part of a current carrying circuit, including said electrodes; passing electric current through said circuit of magnitude and duration sufficient to liquify the fibers; and applying pressure across the interfaces during the passage of said current to aid in the bonding of the members.

11. A resistance welding method of bonding members comprising the steps of: placing an insert consisting of a porous mass of randomly oriented refractory metal fibers between said members in abutting relation to provide member-insert-member interfaces; contacting electrodes to said members in a manner to cause the insert to become part of a current carrying circuit, including said electrodes; passing electric current through said circuit of magnitude and duration sufficient to liquify the fibers; and applying pressure across the interfaces during the passage of said current to aid in the bonding of the members.

12. A resistance welding method of cladding metal sheets comprising the steps of: placing an insert consisting of a mass of randomly oriented metal fibers between the sheets to be clad in abutting relation to provide sheet-insert-sheet interfaces; contacting electrodes to said sheets in a manner to cause the insert to become part of a current carrying circuit, including said electrodes; passing electric current through said circuit of magnitude and duration sufficient to liquify the fibers; and applying pressure across the sheet-insert-sheet interfaces during the passage of said current to aid in the cladding of said sheets.

References Cited in the file of this patent

UNITED STATES PATENTS

| 1,509,384 | Walter et al. | Sept. 23, 1924 |
| 2,262,455 | Goodloe | Nov. 11, 1941 |

FOREIGN PATENTS

| 24,958 | Great Britain | Oct. 20, 1910 |